US012361958B2

(12) United States Patent
Beckmann et al.

(10) Patent No.: US 12,361,958 B2
(45) Date of Patent: Jul. 15, 2025

(54) PROCESSING OF MICROPHONE SIGNALS REQUIRED BY A VOICE RECOGNITION SYSTEM

(71) Applicant: DSP Concepts, Inc., Santa Clara, CA (US)

(72) Inventors: Paul Eric Beckmann, Sunnyvale, CA (US); Shashank Bharathi, Santa Clara, CA (US)

(73) Assignee: DSP Concepts, Inc., Santa Clara, CA (US)

(*) Notice: Subject to any disclaimer, the term of this patent is extended or adjusted under 35 U.S.C. 154(b) by 331 days.

(21) Appl. No.: 17/975,430

(22) Filed: Oct. 27, 2022

(65) Prior Publication Data

US 2023/0126255 A1   Apr. 27, 2023

Related U.S. Application Data

(60) Provisional application No. 63/272,524, filed on Oct. 27, 2021.

(51) Int. Cl.
  *G10L 21/0216*   (2013.01)
  *G10L 15/22*   (2006.01)
  *G10L 21/0208*   (2013.01)

(52) U.S. Cl.
  CPC ........ *G10L 21/0216* (2013.01); *G10L 15/22* (2013.01); *G10L 2021/02082* (2013.01); *G10L 2021/02166* (2013.01)

(58) Field of Classification Search
  None
  See application file for complete search history.

(56) References Cited

U.S. PATENT DOCUMENTS

| | | |
|---|---|---|
| 5,933,506 A | 8/1999 | Aoki et al. |
| 9,653,060 B1 | 5/2017 | Hilmes et al. |
| 10,304,475 B1 | 5/2019 | Wang et al. |

(Continued)

FOREIGN PATENT DOCUMENTS

| | | |
|---|---|---|
| WO | WO-2022155135 A1 | 7/2022 |
| WO | WO-2022204097 A1 | 9/2022 |

OTHER PUBLICATIONS

Klimanis, Gints, et al., "Apparatus and Method for Acoustic Echo Cancellation with Occluded Voice Sensor", U.S. Appl. No. 17/321,238, Unpublished Patent Application filed May 14, 2021, 28 pgs.

(Continued)

*Primary Examiner* — Douglas Godbold
(74) *Attorney, Agent, or Firm* — Schwegman Lundberg & Woessner, P.A.

(57) ABSTRACT

A method of processing microphone signals generates a specified or required multichannel microphone input for a voice recognition system. The method comprises receiving first and second microphone signal from first and second microphones that have a spacing that is required by a voice response or recognition system. The first and second microphone signals are processed using at least one additional microphone signal to generate a first modified microphone signal and a second modified microphone signal respectively. The first and second modified microphone signals are then provided as required microphone inputs to a voice response or recognition system.

20 Claims, 8 Drawing Sheets

(56) References Cited

U.S. PATENT DOCUMENTS

| | | | |
|---|---|---|---|
| 10,389,861 B2 | 8/2019 | Mani et al. | |
| 10,755,728 B1* | 8/2020 | Ayrapetian | G10L 21/0272 |
| 11,277,685 B1* | 3/2022 | Ayrapetian | G10L 21/0208 |
| 11,386,911 B1 | 7/2022 | Chelliah et al. | |
| 11,398,241 B1* | 7/2022 | Mansour | H04R 1/326 |
| 2009/0022336 A1 | 1/2009 | Visser et al. | |
| 2011/0178798 A1 | 7/2011 | Flaks et al. | |
| 2012/0243676 A1 | 9/2012 | Beaucoup et al. | |
| 2014/0003611 A1 | 1/2014 | Mohammad et al. | |
| 2014/0286498 A1 | 9/2014 | Sudo et al. | |
| 2014/0355752 A1 | 12/2014 | Sorensen et al. | |
| 2019/0272842 A1* | 9/2019 | Bryan | G10L 21/0272 |
| 2019/0349471 A1 | 11/2019 | Ferguson et al. | |
| 2020/0212601 A1 | 7/2020 | Gorcea | |
| 2020/0274972 A1 | 8/2020 | Weruaga | |
| 2020/0279575 A1 | 9/2020 | Unno | |
| 2020/0410993 A1* | 12/2020 | Mäkinen | G10L 15/20 |
| 2020/0411026 A1* | 12/2020 | Asfaw | H04R 1/406 |
| 2022/0086579 A1 | 3/2022 | Holstrom et al. | |
| 2022/0114995 A1* | 4/2022 | Kuthuru | G10L 21/0208 |
| 2022/0189497 A1* | 6/2022 | Rui | H04R 1/1083 |
| 2022/0225024 A1 | 7/2022 | Ramanthan et al. | |
| 2022/0303386 A1 | 9/2022 | Beckmann | |
| 2022/0310107 A1* | 9/2022 | Liu | G10L 25/51 |
| 2022/0351742 A1* | 11/2022 | Popovic | G10L 21/0216 |
| 2023/0066600 A1* | 3/2023 | Sha | G10K 11/17885 |
| 2023/0197050 A1* | 6/2023 | Von Bulow | G10K 11/17854 |
| | | | 381/71.6 |
| 2024/0071404 A1* | 2/2024 | Morton | G10K 11/17823 |
| 2024/0292150 A1* | 8/2024 | Xuan | H04R 1/406 |

OTHER PUBLICATIONS

DSP Concepts "CES 2020 Demonstration Placards", (Jan. 7, 2020), 3 pages.

* cited by examiner

PROCESSING OF MICROPHONE SIGNALS REQUIRED BY A VOICE RECOGNITION SYSTEM

RELATED APPLICATION DATA

This application claims the benefit of U.S. Provisional Patent Application No. 63/272,524 filed Oct. 27, 2021, the contents of which are incorporated herein as if explicitly set forth.

BACKGROUND

Voice command functionality is becoming ubiquitous and consumer expectations for correct functioning of voice commands in noisy environments is increasing. A well-known example of a device that uses voice command functionality is the so-called "smart speaker," which is a type of loudspeaker and voice command device with an integrated virtual assistant that offers interactive responses and hands-free activation with the help of a trigger word or trigger phrase. Two well-known examples of such voice assistants are Google Assistant (with trigger phrase "Hey Google . . . ") and Amazon Alexa (with the trigger word "Alexa").

Trigger word detection and command recognition are performed on an audio signal that is captured from the environment by one or more microphones using automatic speech recognition (ASR). Recognition of trigger words and subsequent voice commands can be improved by processing the audio signal to reduce the amount of ambient or other noise that is present in the speaker's environment.

BRIEF DESCRIPTION OF THE SEVERAL VIEWS OF THE DRAWINGS

Some example embodiments of the present disclosure are illustrated by way of example and not limitation in the figures of the accompanying drawings, in which like reference numbers indicate similar elements. To easily identify the discussion of any particular element or act, the most significant digit or digits in a reference number refer to the figure number in which that element is first introduced.

DETAILED DESCRIPTION

In some examples, provided is a non-transitory computer-readable storage medium, the computer-readable storage medium including instructions that when executed by a computer, cause the computer to receive a first microphone signal from a required first microphone, receive a second microphone signal from a second required microphone, receive at least one additional microphone signal from one or more additional microphones, process the first microphone signal to generate a first modified microphone signal, process the second microphone signal using the at least one additional microphone signal to generate a second modified microphone signal, and provide the first and second modified microphone signals as required first and second microphone inputs to a voice recognition system.

In some examples, provided is a method of processing microphone signals to generate a required multichannel microphone input for a voice recognition system, including receiving a first microphone signal from a required first microphone, receiving a second microphone signal from a second required microphone, receiving at least one additional microphone signal from one or more additional microphones, processing the first microphone signal using the at least one additional microphone signal to generate a first modified microphone signal, processing the second microphone signal using the at least one additional microphone signal to generate a second modified microphone signal, and providing the first and second modified microphone signals as required first and second microphone inputs to a voice recognition system.

In some examples, provided is a computing apparatus includes a processor and a memory storing instructions that, when executed by the processor, configure the apparatus to receive a first microphone signal from a required first microphone, receive a second microphone signal from a second required microphone, receive at least one additional microphone signal from one or more additional microphones, process the first microphone signal using the at least one additional microphone signal to generate a first modified microphone signal, process the second microphone signal using the at least one additional microphone signal to generate a second modified microphone signal, and provide the first and second modified microphone signals as required first and second microphone inputs to a voice recognition system.

The first microphone and second microphone may have a spacing that is required by a specification of a voice recognition system.

The first microphone, the second microphone and the at least one additional microphone may be part of a microphone array, and the processing of the first and second microphone signals may include beamforming and noise reduction using the at least one additional microphone signal.

The at least one additional microphone signal may include primarily noise and the processing of the first and second microphone signals may include removing the additional microphone signal from the first and second microphone signals.

The second microphone and the at least one additional microphone may be part of a microphone array, and the processing of the first and second microphone signals may include echo cancellation.

Other technical features may be readily apparent to one skilled in the art from the following figures, descriptions, and claims.

Figure 1:
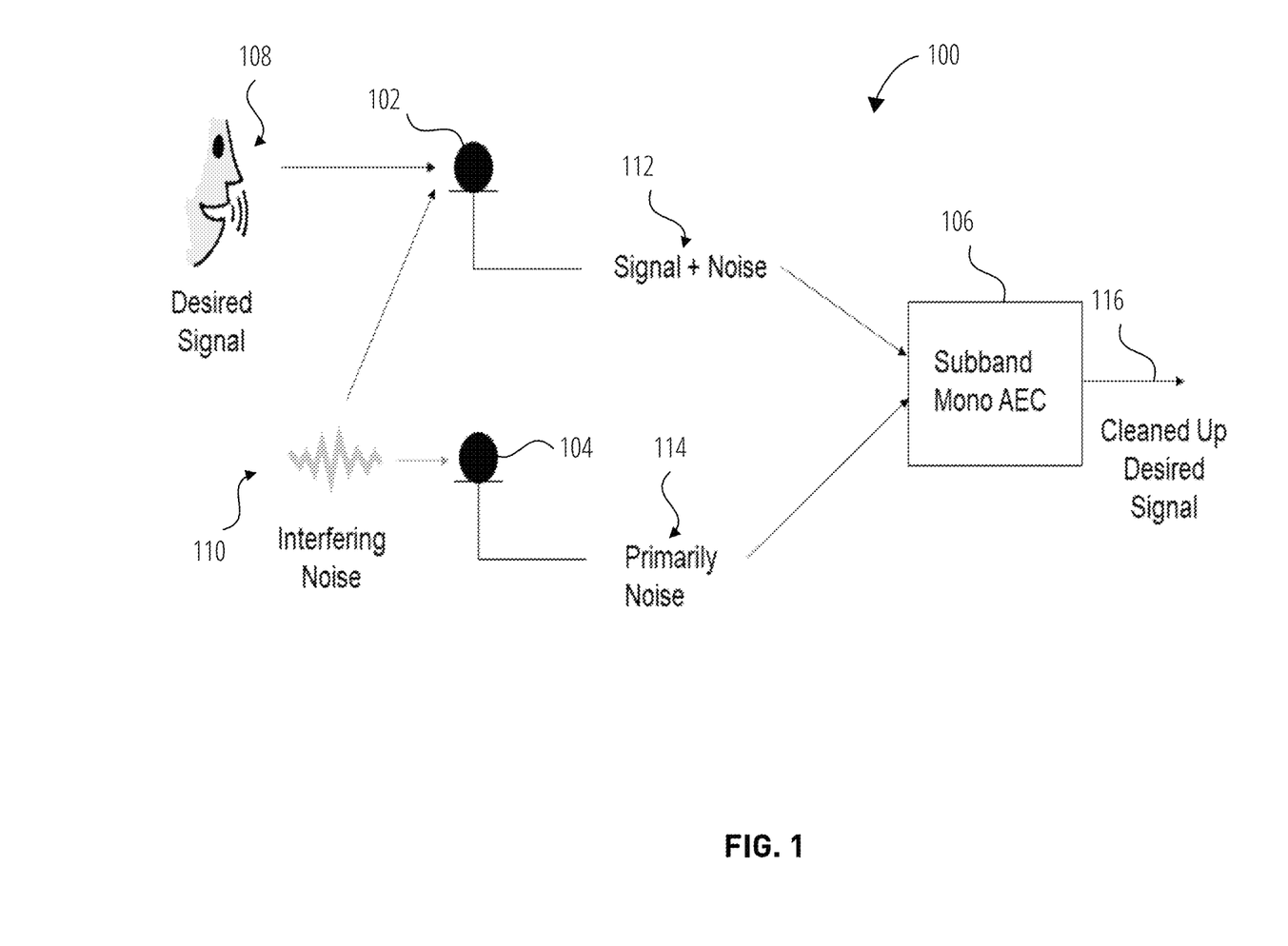
FIG. 1 illustrates a system for noise reduction in accordance with one example.

FIG. 1 illustrates a system for noise reduction in accordance with one example. The system 100 includes a first microphone arrangement 102, a second microphone arrangement 104 and one or more noise reduction modules 106. The first microphone arrangement 102 and the second microphone arrangement 104 may share one or more individual microphones, with the first microphone arrangement 102 being configured to capture a signal 112 that includes both a desired signal 108 and an interfering noise signal 110 and the second microphone arrangement 104 being configured to capture a signal 114 that includes primarily the noise signal 110. In some examples, first microphone arrangement 102 and second microphone arrangement 104 comprise microphones within a microphone array, and beamforming is used to detect and capture the two signals.

The signal 112 and signal 114 are then provided to one or more noise reduction modules 106, which remove the signal 114 from the signal 112 and perform other processing to generate a cleaned up output signal 116 that is then provided to an ASR system. The cleaned-up output signal 116 is a version of the signal 112 that is a better representation of the desired signal 108, with substantially less of the interfering noise signal 110.

Figure 2:
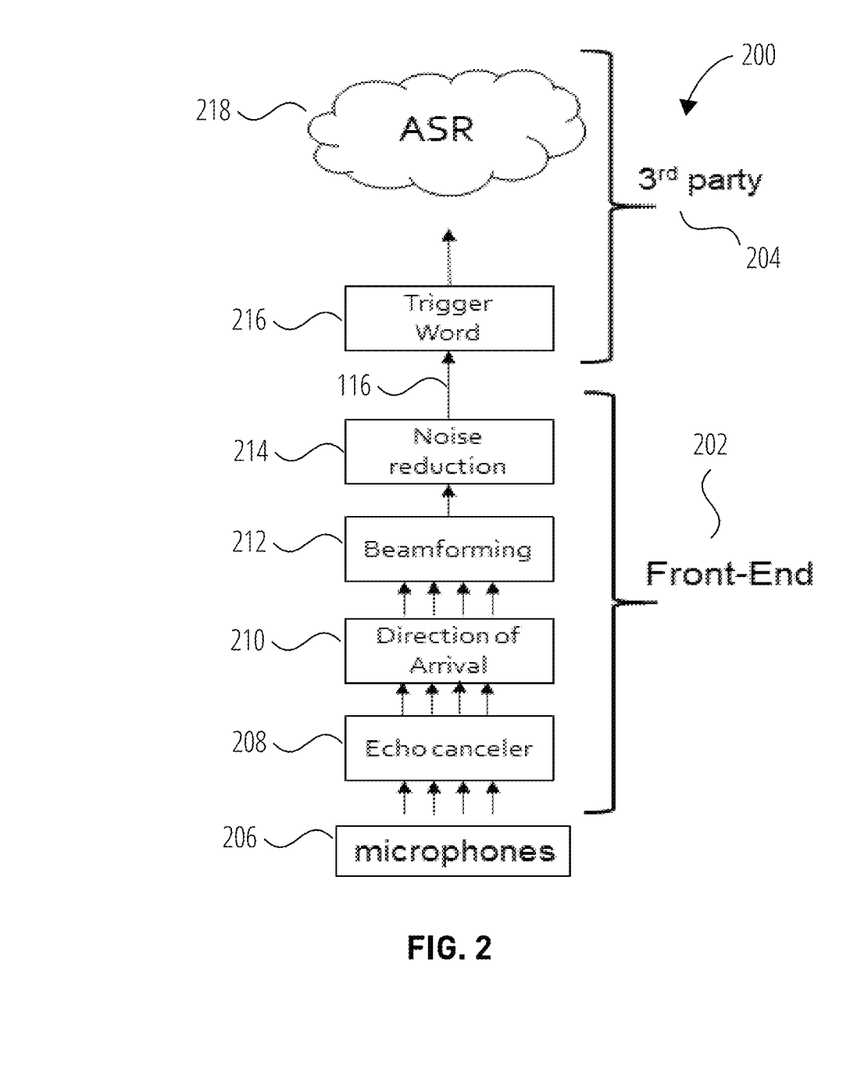
FIG. 2 illustrates a voice command system in accordance with one example.

FIG. 2 illustrates a voice command system 200 in accordance with one example. The system includes a proprietary front end 202 that provides a cleaned up signal to a third-party voice integration service 204 such as Google Voice or Amazon Alexa. The front end 202, which may for example be embodied in a smart speaker, receives signals from microphones 206. The microphone signals are processed by an echo canceler 208, a sound direction detector 210, a beamformer 212 and a noise reduction module 214. The echo canceler 208 allows microphones to hear voice commands even while the smart speaker is playing music or other audio. The sound direction detector 210 determines the direction of arrival of sound, thereby to determine the location of a sound source, which is then used to steer the beamformer 212. The beamformer 212 combines multiple microphone signals using far-field beamforming methods to improve the quality of voice recognition. The noise reduction module 214 removes background noise to further improve the captured output signal 116.

The output signal 116 is then provided to the voice integration service 204, which includes a trigger word detector 216 and automatic speech recognition module 218. The voice integration service 204 may be partly implemented on the smart speaker (or other device) and partly in a networked cloud-based implementation.

Figure 3:
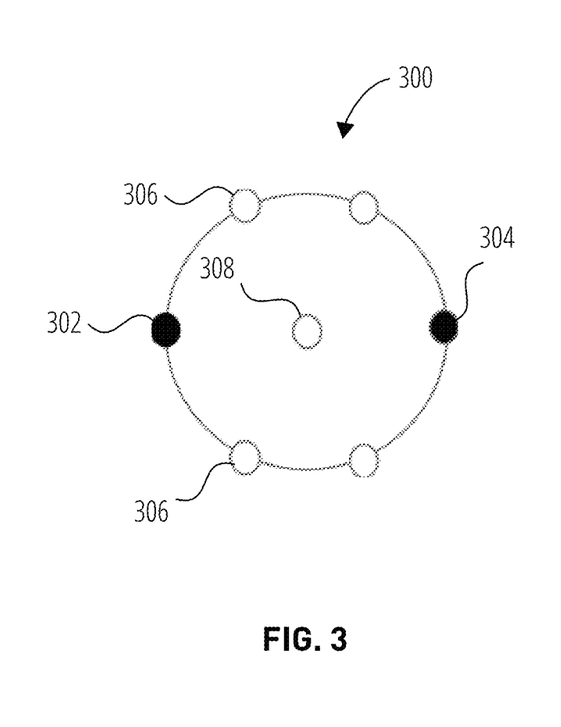
FIG. 3 illustrates a microphone array for a smart speaker in accordance with one example

FIG. 3 illustrates a microphone array 300 for a smart speaker in accordance with one example. In this example, which is seen from above, a cylindrical smart speaker has a first specified microphone 302, a second specified microphone 304, peripheral secondary microphones 306 and a central secondary microphone 308.

Some voice integration services 204, such as Google Assistant, specify a certain number and arrangement of microphones. Currently, Google requires that its ASR API is to receive signals directly from two microphones only, with a fixed 66-71 mm spacing. Little variation in products or performance is possible, but arguably the signals received by Google Assistant are more consistent across different hardware manufacturers and smart speaker modules.

Amazon Voice Services on the other hand requires only that a single clean signal be provided for trigger word detection and ASR. Any microphone geometry is permitted and any number of microphones, configurations and form factors are permitted. This flexibility may result in improved performance, depending on the implementation.

The microphone array 300 may be used in either case, but its use will be described herein with particular relevance to the situation in which a number of microphones and their spacing is defined, as for Google Assistant. In the illustrated example, first specified microphone 302 and second specified microphone 304 are microphones whose spacing, type, configuration or other parameters are specified or required by a party other than by the provider of the smart speaker or other device, such as by Google in their Google Assistant specification, while the central secondary microphone 308 and four other peripheral secondary microphones 306 are included to permit additional audio processing as discussed below.

Figure 4:
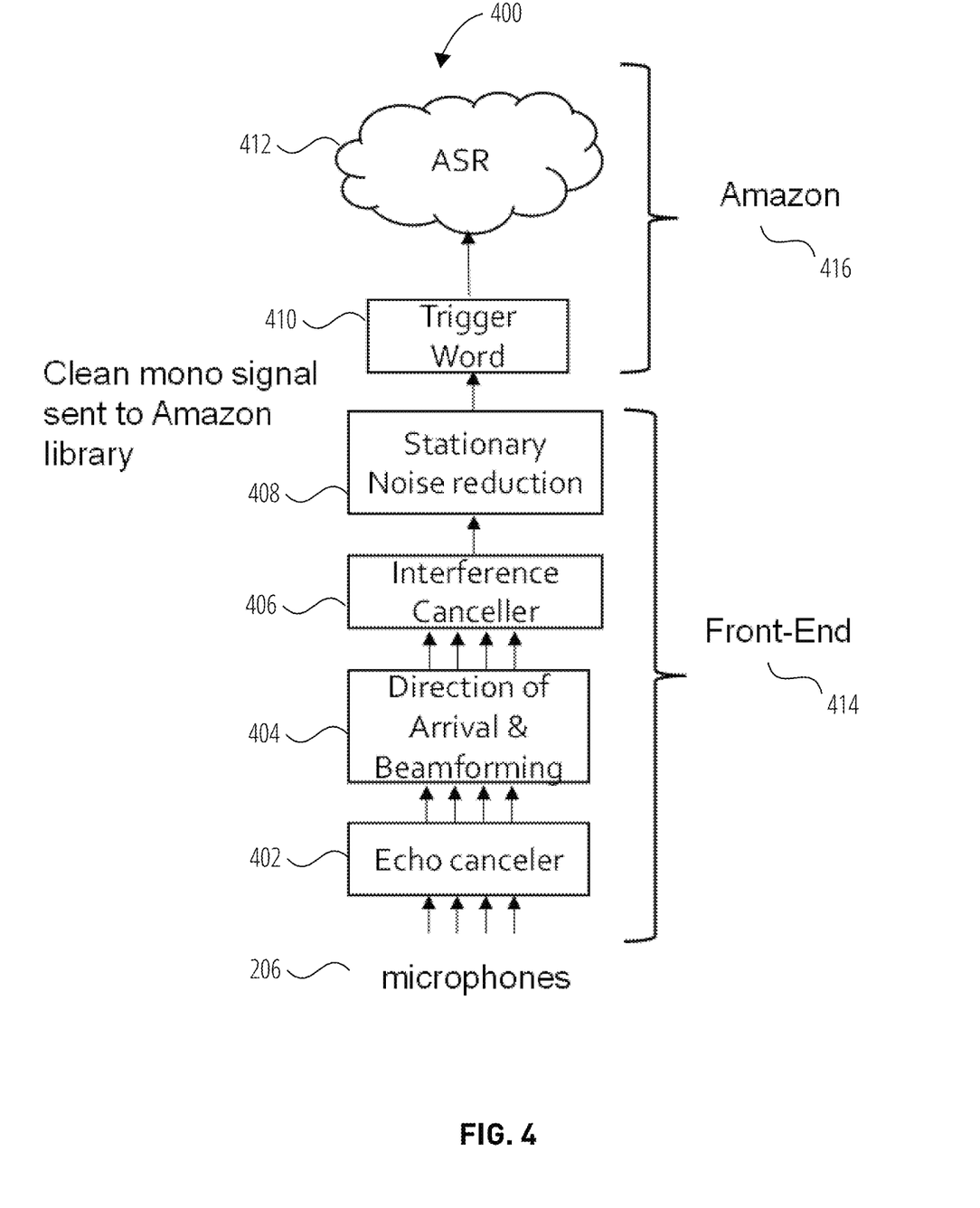
FIG. 4 illustrates a proprietary audio processing front end for use with Amazon Alexa in accordance with one example

FIG. 4 illustrates a proprietary audio processing front end 414 for use with Amazon Alexa in accordance with one example. In this example, a voice command system 400 includes a front end 414 and a voice integration service 416 (Amazon Alexa in this case) as for voice command system 200. The front end 414 includes an echo canceler 402 that receives signals from microphones 206, a sound direction detector & beamformer 404, an interference canceler 406 and a noise reduction module 408. The front end 414 processes the signals from the microphones 206 to provide a clean mono signal to the voice integration service 416. The voice integration service 416 includes a trigger word detector 410 and automatic speech recognition 412 as for FIG. 2.

Figure 5:
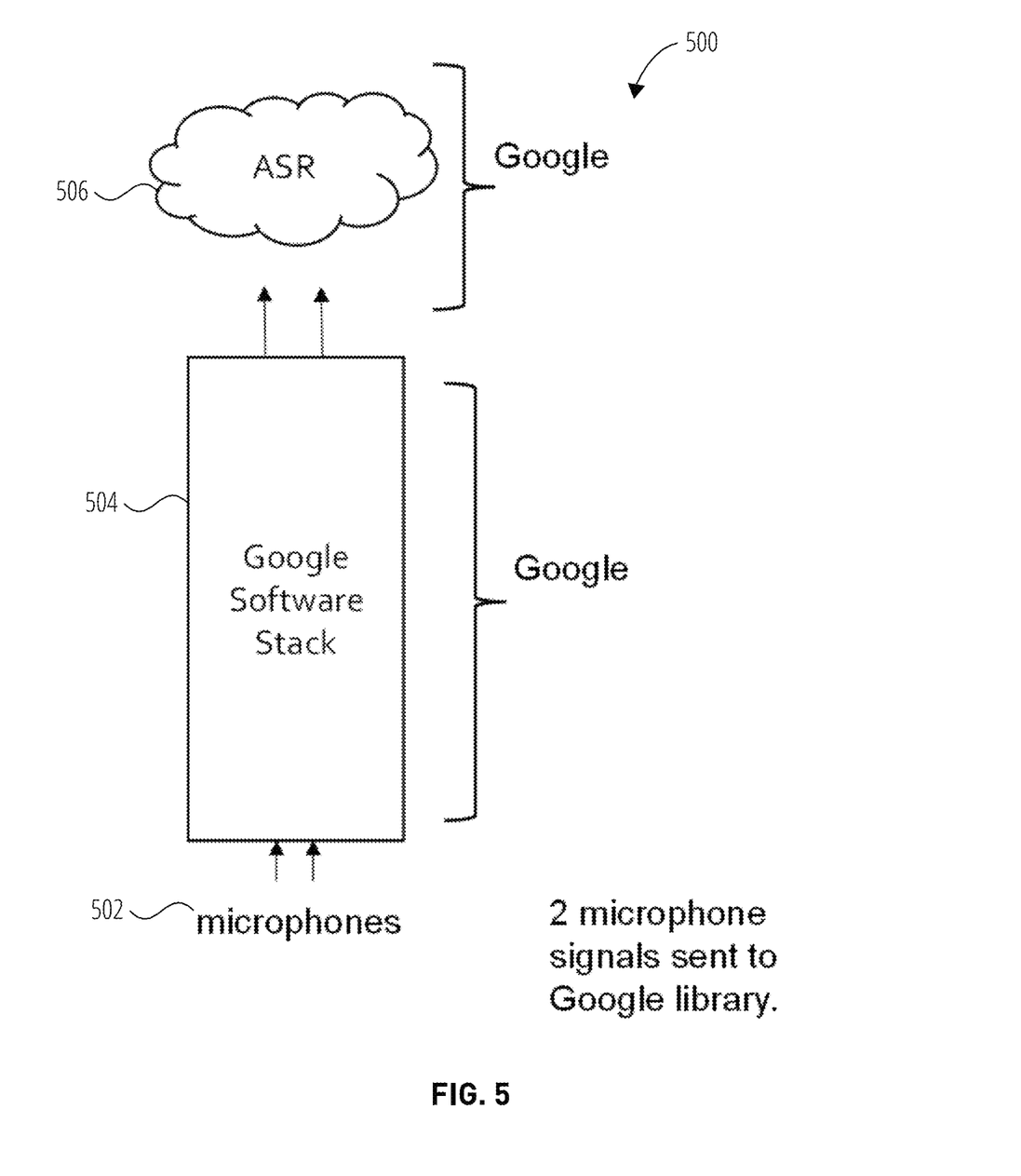
FIG. 5 illustrates a Google Assistant audio processing architecture.

FIG. 5 illustrates a Google Assistant audio processing architecture, according to some examples. As can be seen, a Google Assistant voice command system 500 includes a Google software stack 504 that receives signals from two specified microphones 502. The Google software stack 504 provides noise reduction processing of the signals from the two specified microphones 502, and in turn passes them on to the automatic speech recognition module 506. Due to the fact that the noise reduction processing is located in the Google software stack 504 and the fact that the microphones are specified, this architecture provides less flexibility to hardware device manufacturers.

Figure 6:
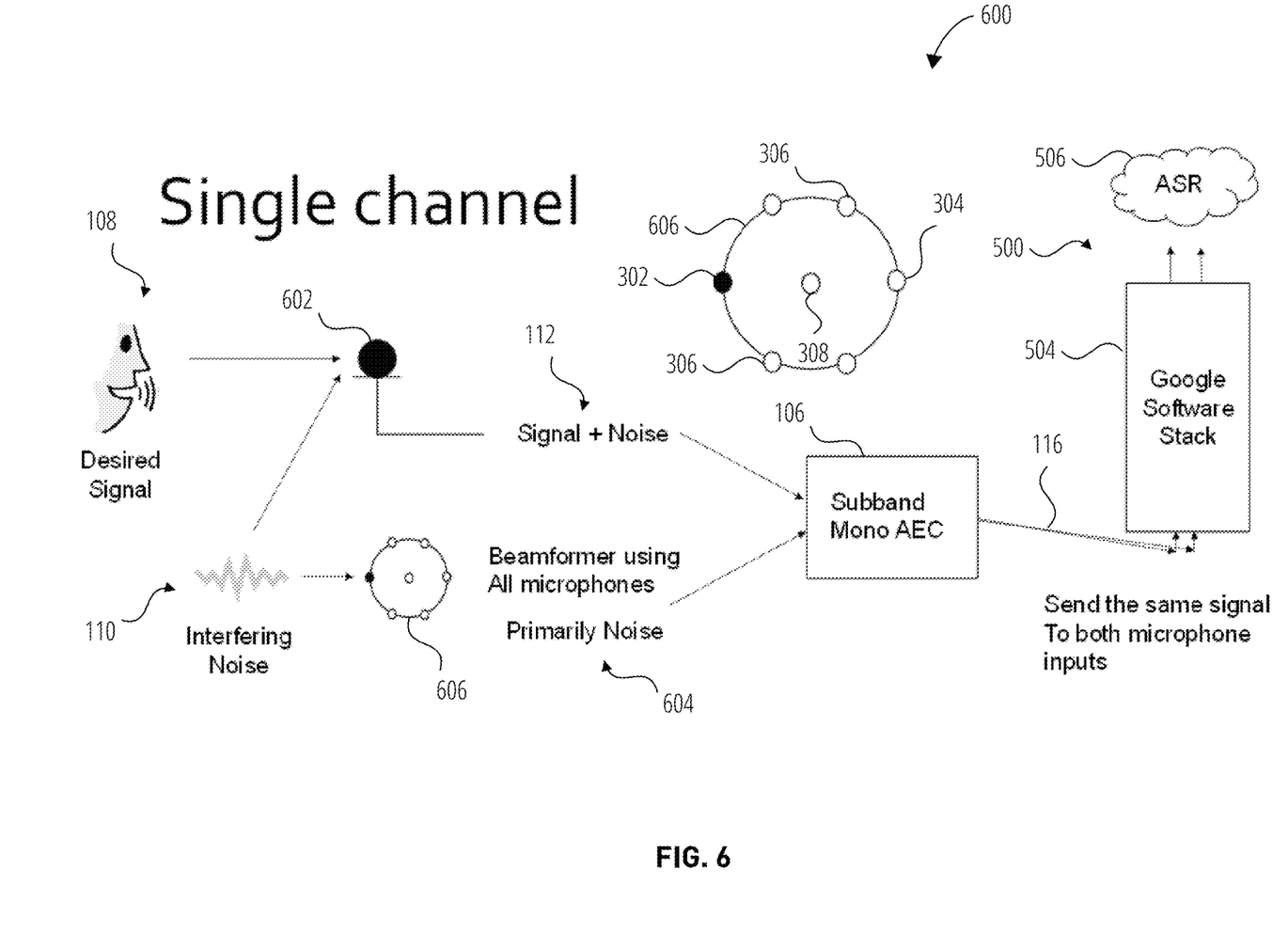
FIG. 6 illustrates a noise reduction system for use with an ASR system in accordance with one example.

FIG. 6 illustrates a noise reduction system for use with a voice command system in accordance with one example. This example seeks to improve the signal provided to a voice command system or other ASR system in which the number and positioning of the microphones is specified, as for voice command system 500.

The system 600 includes a first microphone 602, a microphone array 606 (of which first microphone 602 is part), and one or more noise reduction modules 106. The microphone array 606 may be the microphone array 300 of FIG. 3, and the first microphone 602 may be the first specified microphone 302 or second specified microphone 304 from the microphone array 300 in one example.

In use, the first microphone 602 captures a signal 112 that includes both a desired signal 108 and an interfering noise signal 110. The microphone array 606 is configured to capture a signal 604 that includes primarily the noise signal 110, using beamforming.

The signal 112 and signal 114 are then provided to one or more noise reduction modules 106, which remove the signal 114 from the signal 112 and perform other processing to generate a cleaned up output signal 116 that is provided to the Google Assistant voice command system 500. The one or more noise reduction modules 106 may for example comprise the front end 202 described above with reference to FIG. 2.

In this example, since the voice command system 500 specifies that two microphone signals are required, the output signal 116 is duplicated and the same signal is then provided to both inputs of the Google software stack 504 of the voice command system 500.

Since a single output signal 116 is being duplicated to provide the input to the voice command system 500, the configuration of the microphones may not in fact correspond to the specific requirements of the automatic speech recognition module 506. This provides design flexibility to the manufacture of the relevant audio device, which can then design an audio device with a microphone arrangement that does not meet the specified requirements, while still being compatible with the automatic speech recognition module 506. Provided that the noise reduction module 106 performs adequate processing in advance of transmission to the Google software stack 504, the lack of a phase relationship between the duplicated output signal 116 is not a material disadvantage.

Figure 7:
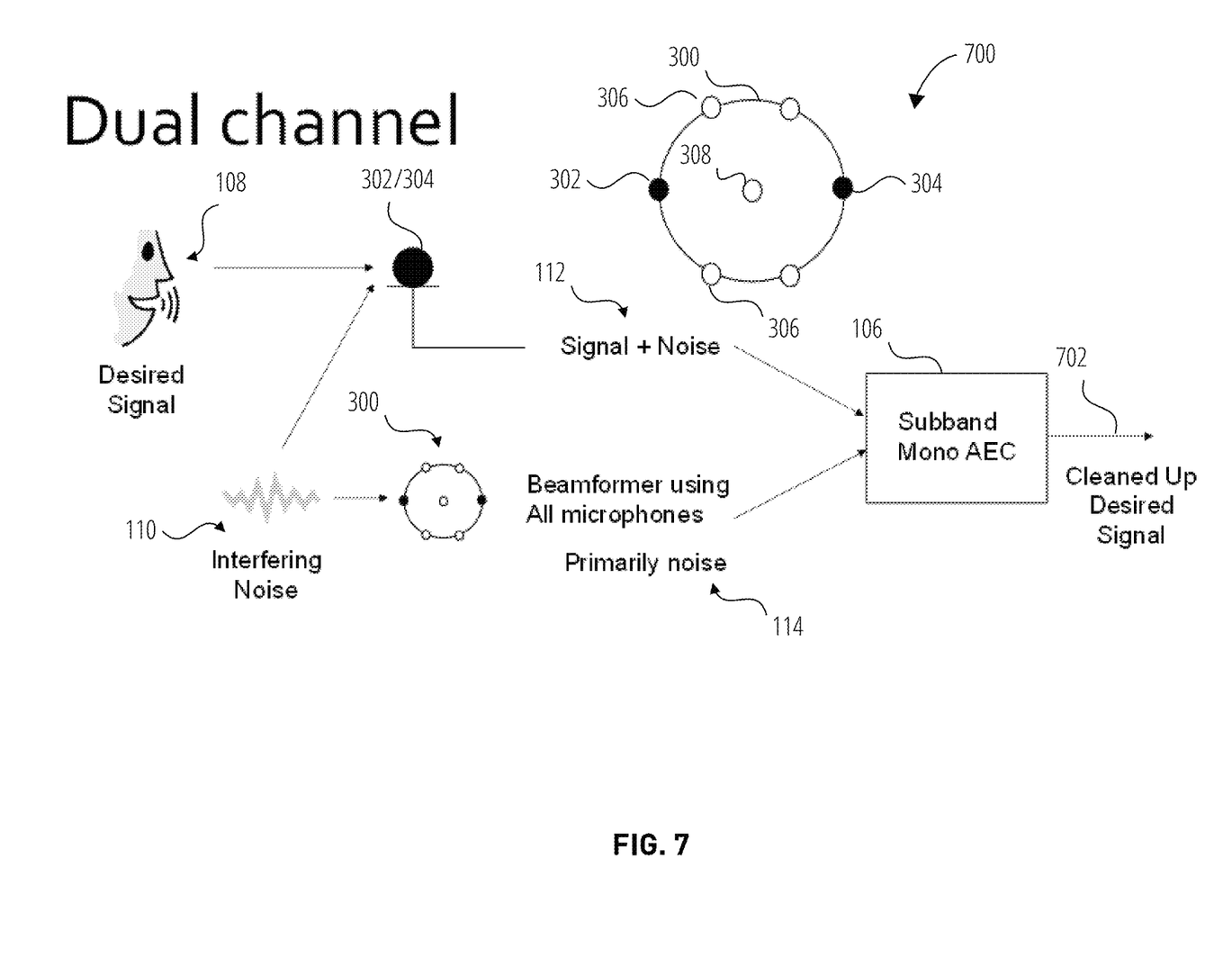
FIG. 7 illustrates a noise reduction system for use with an ASR system in accordance with another example.

FIG. 7 illustrates a noise reduction system for use with a voice command system in accordance with another example. This example also seeks to improve the signal provided to a voice command system or other ASR system in which the number and positioning of the microphones is specified, as for voice command system 500.

The system 700 includes the microphone array 300 of FIG. 3, and one or more noise reduction modules 106. The one or more noise reduction modules 106 may for example comprise the front end 202 described above with reference to FIG. 2. The microphone array 300 has a first specified microphone 302, a second specified microphone 304, peripheral secondary microphones 306 and a central secondary microphone 308. The first specified microphone 302 and second specified microphone 304 are as required by the Google Assistant specification (i.e., two microphones with a fixed 66-71 mm spacing) in some examples, while the central secondary microphone 308 and four other peripheral secondary microphones 306 are included to permit additional audio processing.

Although only one channel is illustrated in FIG. 7, two substantially identical versions of the channel as illustrated in FIG. 7 are provided, one for first specified microphone 302 and one for second specified microphone 304. That is, one of the channels generates a cleaned-up desired signal 702 from first specified microphone 302 while the other channel generates a cleaned-up desired signal 702 from the second specified microphone 304.

In use, the first specified microphone 302 (or the second specified microphone 304 for the second channel) captures a signal 112 that includes both a desired signal 108 and an interfering noise signal 110. The microphone array 300 in turn is configured to capture a signal 114 that includes only the noise signal 110 using beamforming.

The signal 112 and signal 114 are then provided to one or more noise reduction modules 106, which remove the signal 114 from the signal 112 and perform other processing to generate a cleaned up output signal 116. Since there are two channels, one for first specified microphone 302 and one for second specified microphone 304, two cleaned up output signals are generated, one for each of the two microphones as required by the Google Assistant specification. These two signals, which are modified versions of the signals received from the first specified microphone 302 and the second specified microphone 304, are then provided as inputs to the Google software stack 504 of the voice command system 500. Since the first specified microphone 302 and second specified microphones 304 are as required and defined by the Google Assistant specification, phase difference and other audio characteristics of the two signals (as would be expected by the Google software stack 504) are preserved as compared to the implementation of FIG. 6.

Figure 8:
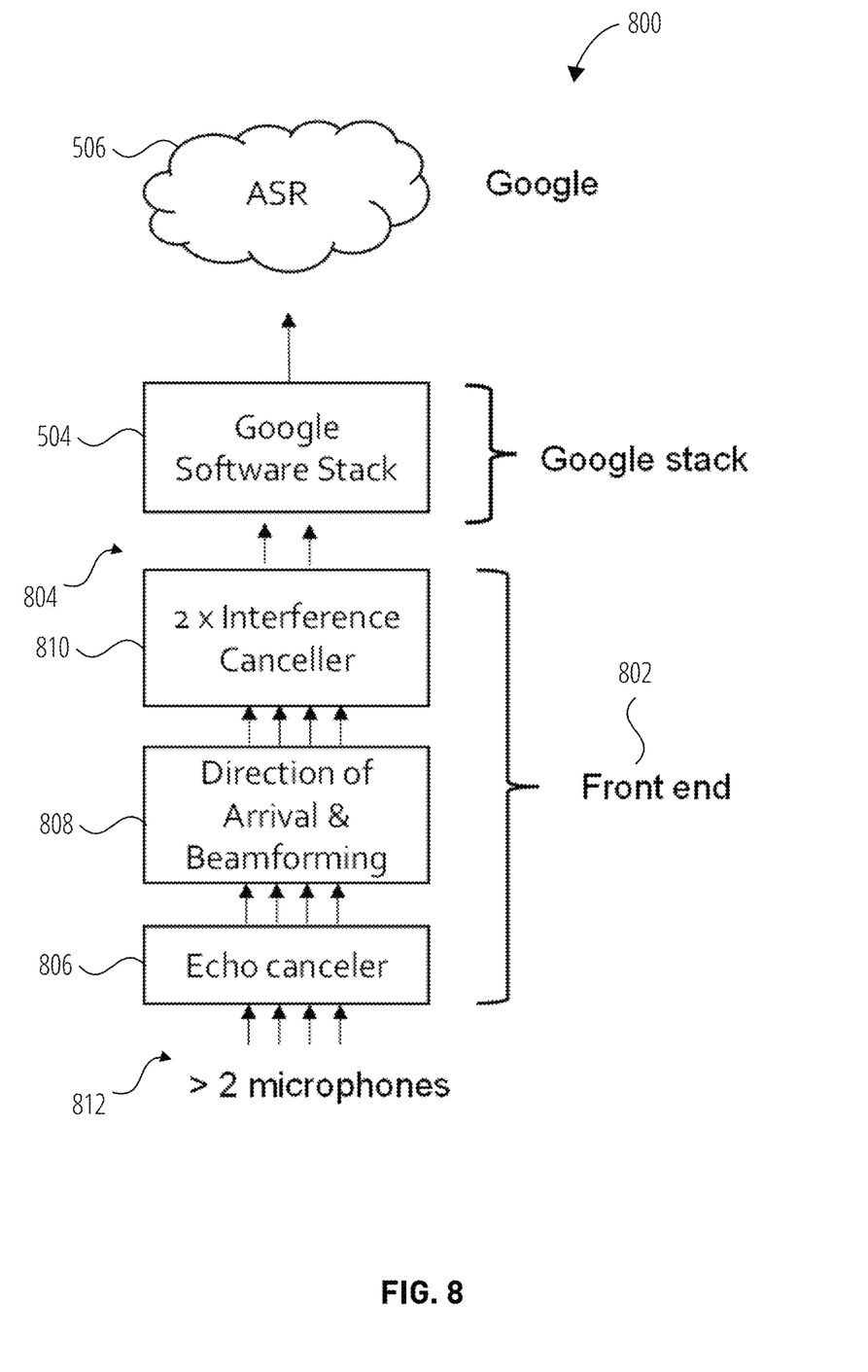
FIG. 8 illustrates an implementation of the noise reduction system of FIG. 7 in accordance with one example.

FIG. 8 illustrates an implementation of the noise reduction system of FIG. 7 in accordance with one example. A voice command system 800 includes a proprietary front end 802 that provides a cleaned up signal to a third-party voice integration service that requires or specifies input from a plurality of microphones such as Google Voice. In the illustrated example, the third party voice integration service includes the Google software stack 504 and automatic speech recognition module 506.

The front end 802, which may for example be embodied in a smart speaker or other voice command or ASR device, receives primary microphone signals 812 from a microphone array (e.g. microphone array 300) comprising three or more microphones. The front end 802 processes the signals as described with reference to FIG. 7 in one example, to generate the required or specified number of microphone signals, which in the illustrated example are two processed or secondary microphone signals 804. The primary microphone signals 812 in some examples include signals from microphones that are as specified by the provider of the voice integration service, on which the secondary microphone signals 804 are based.

The primary microphone signals 812 are processed by an echo canceler 806, a sound direction detector & beamformer 808, and interference cancelers 810. The echo canceler 806 allows microphones to hear voice commands even while the smart speaker (or other device) is playing music or other audio. The sound direction detector & beamformer 808 determines the direction of arrival of sounds and combines the primary microphone signals 812 using far-field beamforming methods to improve the quality of voice recognition. The echo cancelers 806 remove background noise to further improve the secondary microphone signals 804 that are provided to the Google software stack 504.

The secondary microphone signals 804 are then provided to the voice integration service 204, which includes a trigger word detector 216 and automatic speech recognition module 218. The voice integration service 204 may be partly implemented on the smart speaker (or other device) and partly in a networked cloud-based implementation. The voice integration service thus receives microphone signals that meet the specifications or requirements of the provider of the voice integration service, but these required microphone signals have been improved by the processing performed by the front end 802.

The front end 802 thus provides a "cascaded audio front-end" for a voice recognition or voice command system. The front end starts by receiving signals from N microphones and processes the signals from the N microphones down to X channels, X being greater than 1 and N being greater than X. The N microphones include X microphones that are required or specified by the voice recognition system. The X channels that are provided to the voice recognition system by the audio front end are modified versions of the signals from the (required) X microphones. The X channels are then sent to the voice recognition system. This has the advantage of providing improved X channels corresponding to the X required microphones while maintaining the spatial phase information for the X microphones in the X channels. In one example, X is 2 and N is 3 to 7.

Figure 9:
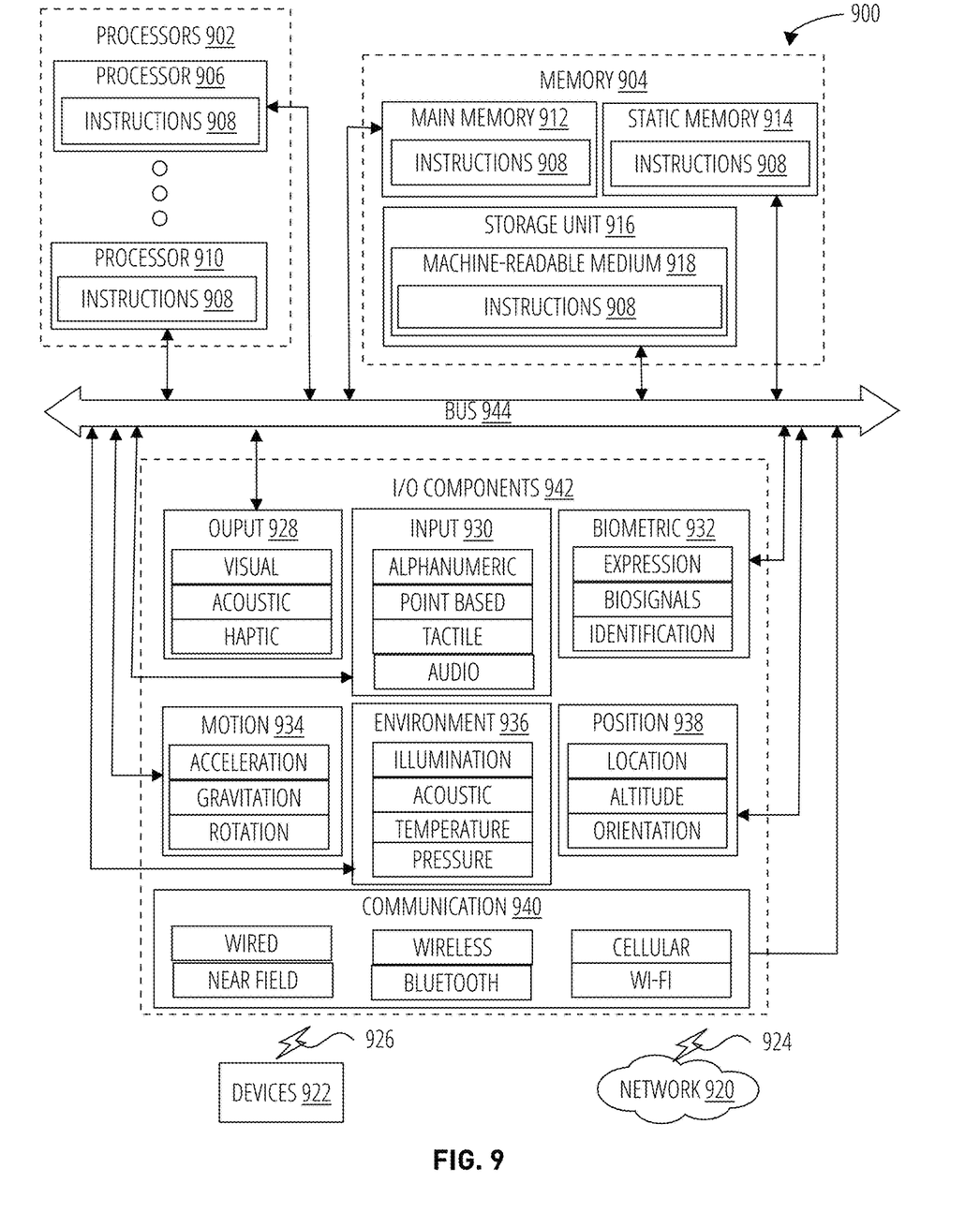
FIG. 9 illustrates a diagrammatic representation of a machine in the form of a computer system within which a set of instructions may be executed for causing the machine to perform any one or more of the methodologies discussed herein, according to an example.

FIG. 9 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 908 (e.g., software, a program, an application, an applet, an app, or other executable code) for causing the machine 900 to perform any one or more of the methodologies discussed herein may be executed. For example the instructions 908 may cause the machine 900 to execute the methods described above. The instructions 908 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines 900 that individually or jointly execute the instructions 908 to perform any one or more of the methodologies discussed herein.

The machine 900 may include processors 902, memory 904, and I/O components 942, which may be configured to communicate with each other such as via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that may execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 may include a main memory 912, a static memory 914, and a storage unit 916, both accessible to the processors 902 such as via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones will likely include a touch input device or other such input mechanisms, while a headless server machine will likely not include such a touch input device. It will be appreciated that the I/O components 942 may include many other components that are not shown in FIG. 9. The I/O components 942 are grouped according to functionality merely for simplifying the following discussion and the grouping is in no way limiting. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 may include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 904, main memory 912, static memory 914, and/or memory of the processors 902) and/or storage unit 916 may store one or more sets of instructions and data structures (e.g., software) embodying or utilized by any one or more of the methodologies or functions described herein. These instructions (e.g., the instructions 908), when executed by processors 902, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 920 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 920 or a portion of the network 920 may include a wireless or cellular network, and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 908 may be transmitted or received over the network 920 using a transmission medium via a network interface device (e.g., a network interface component included in the communication components 940) and utilizing any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 908 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A non-transitory computer-readable storage medium, the computer-readable storage medium including instructions that when executed by a computer, cause the computer to:

receive a first microphone signal from a required first microphone;

receive a second microphone signal from a required second microphone;

receive at least one additional microphone signal from one or more additional microphones;

process the first microphone signal using the at least one additional microphone signal to generate a first modified microphone signal representing audio from a single audio source;

process the second microphone signal using the at least one additional microphone signal to generate a second modified microphone signal representing audio from the single audio source; and provide the first and second modified microphone signals, each representing the single audio source, separately as required first and second microphone inputs to a voice recognition system.

2. The computer-readable storage medium of claim 1, wherein the first microphone and second microphone have a spacing that is required by a specification of a voice recognition system.

3. The computer-readable storage medium of claim 2, wherein the first microphone, the second microphone and the at least one additional microphone are part of a microphone array, and the processing of each of the first and second microphone signals comprises separate echo cancellation.

4. The computer-readable storage medium of claim 3, wherein the first microphone, the second microphone and the at least one additional microphone are part of a microphone array, and the processing of each of the first and second microphone signals comprises separate beamforming and noise reduction using the at least one additional microphone signal.

5. The computer-readable storage medium of claim 2, wherein the first microphone, the second microphone and the at least one additional microphone are part of a microphone array, and the processing of each of the first and second microphone signals comprises separate beamforming and noise reduction using the at least one additional microphone signal.

6. The computer-readable storage medium of claim 1, wherein the first microphone, the second microphone and the at least one additional microphone are part of a microphone array, and the processing of each of the first and second microphone signals comprises separate beamforming and noise reduction using the at least one additional microphone signal.

7. The computer-readable storage medium of claim 1, wherein the at least one additional microphone signal comprises primarily noise and the processing of each of the first and second microphone signals comprises removing the additional microphone signal from the first and second microphone signals separately.

8. A method of processing microphone signals to generate a required multichannel microphone input for a voice recognition system, comprising:

receiving a first microphone signal from a required first microphone;

receiving a second microphone signal from a required second microphone;

receiving at least one additional microphone signal from one or more additional microphones;

processing the first microphone signal using the at least one additional microphone signal to generate a first modified microphone signal representing audio from a single audio source;

processing the second microphone signal using the at least one additional microphone signal to generate a second modified microphone signal representing audio from a single audio source; and providing the first and second modified microphone signals, each representing the single audio source, separately as required first and second microphone inputs to a voice recognition system.

9. The method of claim 8, wherein the first microphone and second microphone have a spacing that is required by a specification of a voice recognition system.

10. The method of claim 9, wherein the first microphone, the second microphone and the at least one additional microphone are part of a microphone array, and the processing of each of the first and second microphone signals comprises separate echo cancellation.

11. The method of claim 10, wherein the first microphone, the second microphone and the at least one additional microphone are part of a microphone array, and the processing of each of the first and second microphone signals comprises separate beamforming and noise reduction using the at least one additional microphone signal.

12. The method of claim 9, wherein the first microphone, the second microphone and the at least one additional microphone are part of a microphone array, and the processing of each of the first and second microphone signals comprises separate beamforming and noise reduction using the at least one additional microphone signal.

13. The method of claim 8, wherein the first microphone, the second microphone and the at least one additional microphone are part of a microphone array, and the processing of each of the first and second microphone signals comprises separate beamforming and noise reduction using the at least one additional microphone signal.

14. The method of claim 8, wherein the at least one additional microphone signal comprises primarily noise and the processing of each of the first and second microphone signals comprises removing the additional microphone signal from the first and second microphone signals separately.

15. A computing apparatus comprising:
a processor; and
a memory storing instructions that, when executed by the processor, configure the apparatus to:
receive a first microphone signal from a required first microphone;
receive a second microphone signal from a required second microphone;
receive at least one additional microphone signal from one or more additional microphones;
process the first microphone signal using the at least one additional microphone signal to generate a first modified microphone signal representing audio from a single audio source;
process the second microphone signal using the at least one additional microphone signal to generate a second modified microphone signal representing audio from a single audio source; and
provide the first and second modified microphone signals, each representing the single audio source, separately as required first and second microphone inputs to a voice recognition system.

16. The computing apparatus of claim 15, wherein the first microphone and second microphone have a spacing that is required by a specification of a voice recognition system.

17. The computing apparatus of claim 16, wherein the first microphone, the second microphone and the at least one additional microphone are part of a microphone array, and the processing of each of the first and second microphone signals comprises separate echo cancellation.

18. The computing apparatus of claim 16, wherein the first microphone, the second microphone and the at least one additional microphone are part of a microphone array, and the processing of each of the first and second microphone signals comprises separate beamforming and noise reduction using the at least one additional microphone signal.

19. The computing apparatus of claim 15, wherein the first microphone, the second microphone and the at least one additional microphone are part of a microphone array, and the processing of each of the first and second microphone signals comprises separate beamforming and noise reduction using the at least one additional microphone signal.

20. The computing apparatus of claim 15, wherein the at least one additional microphone signal comprises primarily noise and the processing of each of the first and second microphone signals comprises removing the additional microphone signal from the first and second microphone signals separately.

* * * * *